(12) United States Patent
Ishii et al.

(10) Patent No.: US 8,228,595 B2
(45) Date of Patent: Jul. 24, 2012

(54) SEQUENCE AND TIMING CONTROL OF WRITING AND REWRITING PIXEL MEMORIES WITH SUBSTANTIALLY LOWER DATA RATE

(75) Inventors: Fusao Ishii, Pittsburg, PA (US); YiQing Liu, ShangHai (CN)

(73) Assignee: Silicon Quest Kabushiki-Kaisha (JP)

( * ) Notice: Subject to any disclaimer, the term of this patent is extended or adjusted under 35 U.S.C. 154(b) by 440 days.

(21) Appl. No.: 12/590,372

(22) Filed: Nov. 6, 2009

(65) Prior Publication Data
US 2010/0073270 A1 Mar. 25, 2010

Related U.S. Application Data (63) Continuation-in-part of application No. 11/183,216, filed on Jul. 16, 2005, now Pat. No. 7,215,460, and a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 61/198,614, filed on Nov. 7, 2008.

(51) Int. Cl.
*G02B 26/00* (2006.01)
*G02F 1/29* (2006.01)

(52) U.S. Cl. ......... 359/290; 359/237; 359/291; 359/318

(58) Field of Classification Search .......... 359/290–292, 359/198, 223–225, 245, 260–263, 298, 295, 359/301–303, 317–318
See application file for complete search history.

(56) References Cited

U.S. PATENT DOCUMENTS

| | | | |
|---|---|---|---|
| 4,191,083 A * | 3/1980 | Wilcox et al. | 84/611 |
| 4,229,732 A | 10/1980 | Hartstein et al. | |
| 4,571,603 A | 2/1986 | Hornbeck et al. | |
| 4,969,730 A | 11/1990 | van den Brandt | |
| 5,061,049 A | 10/1991 | Hornbeck | |
| 5,214,420 A | 5/1993 | Thompson et al. | |
| 5,285,407 A | 2/1994 | Gale et al. | |
| 5,293,511 A | 3/1994 | Poradish et al. | |
| 5,452,024 A | 9/1995 | Sampsell | |
| 5,612,713 A | 3/1997 | Bhuva et al. | |
| 5,644,579 A * | 7/1997 | Sheppard | 714/726 |
| 5,673,139 A | 9/1997 | Johnson | |
| 5,686,939 A | 11/1997 | Millward et al. | |
| 5,903,383 A | 5/1999 | Bernstein et al. | |
| 6,128,121 A | 10/2000 | Choi et al. | |
| 6,388,661 B1 | 5/2002 | Richards | |
| 6,538,800 B2 | 3/2003 | Huibers | |
| 6,552,840 B2 | 4/2003 | Knipe | |
| 6,809,977 B1 | 10/2004 | Richards | |
| 6,856,447 B2 | 2/2005 | Huibers et al. | |
| 6,888,521 B1 | 5/2005 | Richards | |

(Continued)

*Primary Examiner* — Dawayne A Pinkney
(74) *Attorney, Agent, or Firm* — Bo-In Lin (57) ABSTRACT

A spatial light modulator driven with binary pulse-width-modulation requires very high data transfer rate to achieve high grayscale. This invention enables to reduce substantially the data transfer rate using non-sequential order of binary bits, wherein the combination of the sequences of binary bits is selected from the combinations which avoid simultaneous writing of multiple rows. The possible number of such combinations is astronomically large and mathematical programs were developed to find right combinations. These results were proposed.

8 Claims, 7 Drawing Sheets

U.S. PATENT DOCUMENTS

| | | |
|---|---|---|
| 7,012,592 B2 | 3/2006 | Richards |
| 7,022,249 B2 | 4/2006 | Valette |
| 7,027,205 B2 | 4/2006 | Richards |
| 7,215,460 B2 | 5/2007 | Ishii |
| 7,268,932 B2 | 9/2007 | Ishii |
| 7,304,783 B2 | 12/2007 | Ishii |
| 2003/0011863 A1 | 1/2003 | Muller |
| 2006/0279496 A1 | 12/2006 | Ogikubo et al. |
| 2007/0041078 A1 | 2/2007 | Pan |
| 2007/0126759 A1 | 6/2007 | Hwang |
| 2007/0258124 A1 | 11/2007 | Chen et al. |
| 2007/0258130 A1 | 11/2007 | Chen et al. |

\* cited by examiner

| | | |
|---|---|---|
| 1230 start=0U | 1 0 1 0 0 0 1 0 0 0 0 0 0 0 1 1 | |
| 3102 start=1U |   1 0 0 0 0 0 0 0 1 0 1 1 0 0 0 1 | |
| 2013 start=3U |       1 0 0 0 1 1 0 1 0 0 0 0 0 0 0 1 | |
| 0321 start=4U |         1 1 0 0 0 0 0 0 1 0 0 0 1 0 1 | |
| Total | 1 1 1 1 1 1 1 1 1 1 1 1 1 1 1 1 1 1 1 | |

| | | |
|---|---|---|
| 3201 start=0U | 1 0 0 0 0 0 0 0 1 0 0 0 1 1 0 1 | |
| 0321 start=1U |   1 1 0 0 0 0 0 0 1 0 0 0 1 0 1 | |
| 1230 start=3U |       1 0 1 0 0 0 1 0 0 0 0 0 0 0 1 1 | |
| 1023 start=4U |         1 0 1 1 0 0 0 1 0 0 0 0 0 0 0 1 | |
| Total | 1 1 1 1 1 1 1 1 1 1 1 1 1 1 1 1 1 1 1 | |

Fig. 6

For 5 bits/5 groups:
Permutation = 5! = 120
Total combination = $120^5$
                  ~25 billions
Starting times are 0, 1, 2, 3, 4U

SEQUENCE AND TIMING CONTROL OF WRITING AND REWRITING PIXEL MEMORIES WITH SUBSTANTIALLY LOWER DATA RATE

CROSS REFERENCE TO RELATED APPLICATIONS

This application is a Non-provisional Application and claims the Priority of Provisional Application 61/198,614 filed on Nov. 7, 2008. This Patent Application is also a Continuation in Part (CIP) Application of patent application Ser. No. 11/183,216 filed on Jul. 16, 2005 and issued into U.S. Pat. No. 7,215,460 B2. This application is also a Continuation in Part (CIP) Application of U.S. patent application Ser. No. 10/698,620 filed on Nov. 1, 2003 now abandoned, patent application Ser. No. 10/699,140 filed on Nov. 1, 2003 issued into U.S. Pat. No. 6,862,127, and patent application Ser. No. 10/699,143 filed on Nov. 1, 2003 issued into U.S. Pat. No. 6,903,860 by the Applicant of this Patent Applications. The disclosures made in these Patent Applications are hereby incorporated by reference in this Patent Application.

TECHNICAL FIELD

This invention relates to spatial light modulator (SLM) arrays and control circuits to control the SLM. More particularly, this invention relates to signal control methods for controlling the non-sequential order and timing of inputting state signals to achieve substantially lower data transfer rate.

BACKGROUND OF THE INVENTION

Even though there are significant advances made in recent years on the technologies of implementing spatial light modulator, there are still limitations and difficulties when employed to provide high quality images display. Specifically, when the display images are digitally controlled, the image qualities are adversely affected due to the fact that the image is not displayed with sufficient number of gray scales. A higher input data rate is required in order to increase the number of gray scales to display the images with sufficient number of gray scales.

Figure 1A:
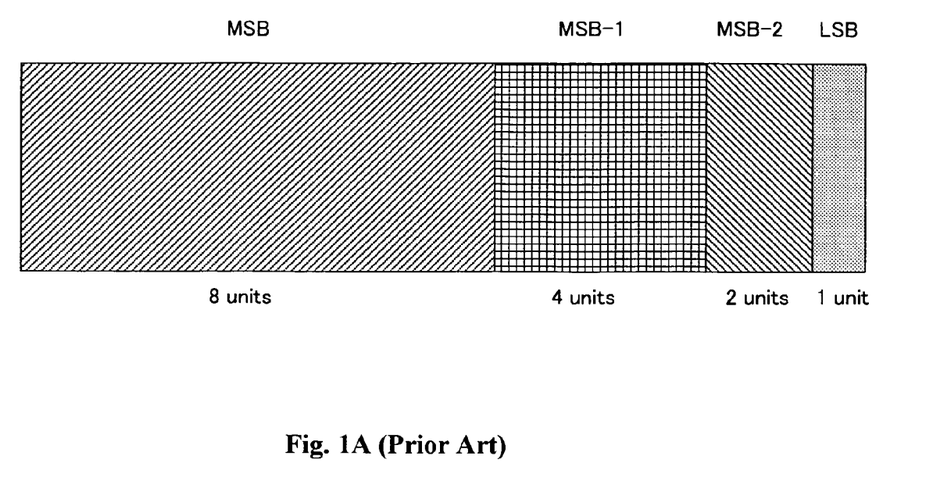
FIG. 1A is the original 4-bit planes.
Figure 1B:
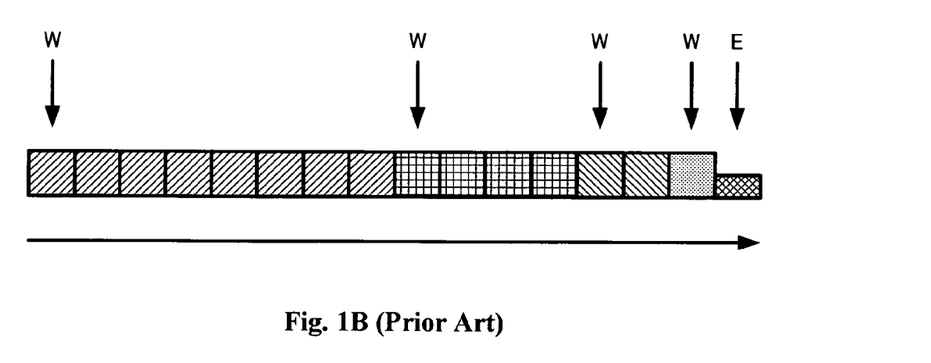
FIG. 1B shows the weight of 4-bit binary PWM and the need to clear after writing for 1 unit time.

For the purpose of illustration, FIG. 1A shows a bit-plane of the image data for displaying images corresponding to the 4-bit grayscales. The time duration represented by the LSB (Least Significant Bit) is the minimum required time to the entire bit plane and is generally referred to as one unit time (1 U). FIG. 1B shows the weight of 4-bit binary data when applied to a pulse-width modulation. The writing process starts from the Most Significant Bit (MSB) to the Least Significant Bit (LSB) and the writing of next bit must be started after completing the writing process of the current bit as indicated by W and the symbol E indicates the end of the writing process.

FIG. 1C is the conventional method to write PWM signal into a 2 dimensional pixel array, where the first data set to be written into a pixel array is the MSB data set containing 1 bit times the number of pixels in the array (if this is a HD TV, 1920×1080=2,073,600 bits. Therefore, it is required to write 1 bit data, i.e., 1 representing an ON state or 0 representing an OFF state, into the entire array, then 128 times the unit time, i.e., 128U, "U" represents the unit time, after the starting time of the first data set writing, the process then starts the writing of the second data set which is the MSB-1, then 64U later from the starting time of the second data set writing, the process then starts the writing of the third data set, and continues down to LSB, 1 times the unit time, i.e., 1U wherein the time length of LSB is 1U by definition. If the LSB is ON, it means the pixel must be ON only for 1U time period. After 1U, the next data, i.e., the MSB may be ON or may be OFF. Therefore, after the LSB is written, it is required to rewrite the pixel after the end of the 1U time period, so that the pixel is ON (or OFF) during LSB (=1U) period.

According to the writing sequence, the writing process must write the entire pixel array in 1U time period. Then the process must rewrite the entire array 1U later. The system speed must be fast enough to write 1 bit of information into each pixel of the entire array. If this is HD-TV, the writing process must be operated to write 1920×1080=2,073,600 bits of data in 1U period. A typical HD-TV refreshes the entire screen 60 times a second. A single panel micromirror represents at least 3 colors in a frame (1/60 seconds). If each color is represented in 1/180 seconds with 8 bit gray scale, the entire array must be written at least in 1U=1/(180×256)=21.7 usec for LSB and practically faster than that because there should be allowance of additional time for blanking (unused time between 2 colors). The length of time represented by 1U is 21.7 usec and practically shorter than that. Some image display system allows only one line writing at a time. Only one line at a time can be written the majority of pixel array system is so in the industry. The process to write data for a line must be within 21.7 usec/1080 lines, i.e., must be shorter than 20 nsec. A conventional PWM system requires the speed of data transfer of 20 nsec per line for 8 bit and 1080 line screen. A typical HD-TV contains 1920 pixels per line and this means that 1920 bits have to be transferred to a device in 20 nanoseconds or this equates to 96 Giga bits per seconds. With the present technology, this speed cannot be achieved easily. An improved system is therefore required to reduce the requirement to enable a low cost and small device.

However, the input data rates are limited by the speed of the controller, data transmission rate over the signal lines and the speed of writing data to the memory in each pixel element. Increasing the input data rates by modifying of controller, the signal transmission lines, and memory writing process through hardware modification can be complicate and economically very costly. For these reasons, there are urgent demand to provide new and improved configuration and methods to overcome such difficulties and limitations.

SUMMARY OF THE INVENTION

The present invention relates to control circuits for micromirror devices and arrays of micromirror devices. The purpose of controlling the arrays is to apply such array as spatial light modulators (SLMs).

In another aspect, the present invention provides a micromirror device that can be operated with a substantially lower data rate while maintaining the same display image quality. Alternately, the device can achieve higher data input rate to achieve improved image quality displayed with image data having a higher number of bits without requiring device operated at higher speed by writing the image data in divided groups at non-sequential order.

BRIEF DESCRIPTION OF THE FIGURES

The present invention is described in detail below with reference to the following Figures.

DETAILED DESCRIPTION OF THE PREFERRED EMBODIMENTS

Figure 2A:
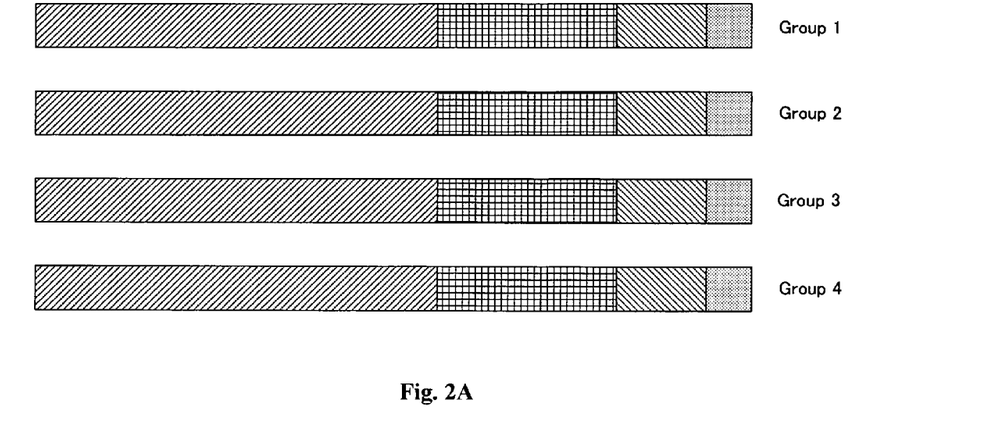
FIG. 2A is the bit-planes divided into 4 groups.
Figure 2B:
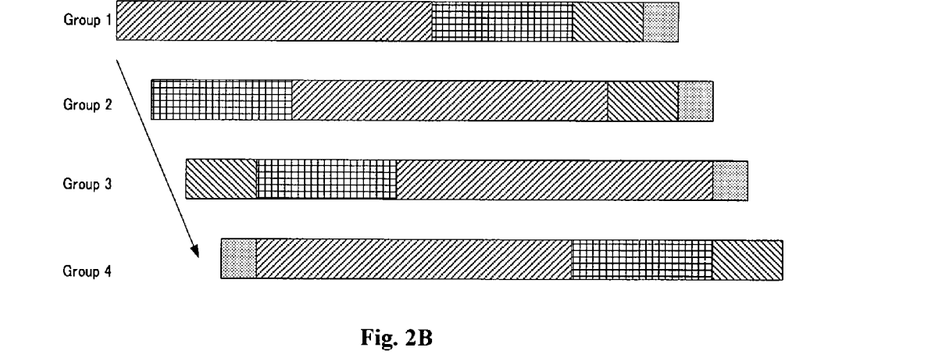
FIG. 2B shows staggered groups for writing the block one at a time.

FIG. 2A shows the bit planes of this invention for a four-bit image data. The bit plane is divided into four groups. By dividing the bit-planes into 4 groups, as shown in FIG. 2A, the time required to write the image data is reduced to one-fourth for each group of data bits as further explained in FIG. 2B. FIG. 2B shows an embodiment of this invention by writing to a block or a group. The writing process shown in FIG. 2B is carried out one at a time in a unit time. The control circuit implemented in an image display system is generally not allowed to write more than one line at a time. By dividing the bit planes into multiple groups, e.g., eight groups, eight times of image data can be sent to the memory circuits of the pixel elements compared to the conventional method of sequential writing process by writing all the data bits in the entire bit plane from the most significant bit (MSB) to the least significant bit (LSB).

According to FIG. 1C, this invention discloses an image display system implemented with a spatial light modulator (SLM) having a plurality of pixel elements to receive and apply image data of multiple bits to display image according to the image data. The image display system further includes a controller to control the writing of the image data into each of the pixel elements by dividing the image data of multiple bits into groups and writing each group of bits into the pixel element in a non-sequential order, i.e., not in the order of MSB to LSB, without a writing conflict of two simultaneous writing processes occur in the same time.

This invention will drastically reduce the speed requirement without sacrificing quality. The conventional system writes the LSB bit plane from top to bottom. By writing only one eighth (⅛) of array the writing speed can be reduced to ⅛ of the speed. The writing process cannot write any of the rest of array, because the display system does not allow multiple line writing, but only a single line at a time. The writing process must write the rest of the unfinished array if the LSB data is written for all the lines. However, if the writing process is controlled not to write the LSB data for the array and controlled to write MSB or other non LSB data into the rest of the array, the writing of the data for the rest of the array may be avoided depending on the combination.

For example, after completing the write process of the MSB data into the first ⅛ lines (1080/8=135 lines, or $1^{st}$ group), the writing process is then controlled to write LSB data into the second ⅛ lines (second 135 lines meaning $136^{th}$ to $270^{th}$ line or $2^{nd}$ group). The non-sequential writing process therefore start with writing MSB in the $1^{st}$ group, then write LSB into the $2^{nd}$ group without conflict during 128U period for the $1^{st}$ group. Therefore, the writing processes as disclosed in this invention can overcome the limitation and "simultaneously" writing into two or more pixels on a single bit lines by making use of the idle time by non-sequentially writing different group of data into pixel elements in multiple lines.

In different embodiments, the writing process can write different groups of data bits into different combinations of lines including adjacent groups of lines, or interleaved lines or any combination of lines. Under circumstances, for the purpose of convenience of control, it is preferable to write each of group of lines that has same number of lines.

As mentioned earlier, writing to a block must be done one at a time, meaning there cannot be more than 1 write to more than 1 block in a unit time. This limitation is because of the control circuit and that is part of the nature of active matrix. The following descriptions explain how the system works. Specifically, the bit lines run vertically and word lines run horizontally. A bit line and a word line cross at a pixel, where there is a transistor working as a switch. This switch will be on only when both bit line and word line are ON, so that a single data can be written to only one pixel selectively. For example, the process can switch on the $888^{th}$ bit line and the $999^{th}$ word line, therefore, the pixel at (888,999) according to the address is switched on and the data bits are written and stored into the pixel. This is the fundamental principle of the pixel drive. The address to write a data selects the vertical line and horizontal line and the pixel at the crossing of the vertical and horizontal line is written. Normally a bit line is connected to all the pixels in a column and a word line is connected to all the pixels in a row.

By preparing multiple bit lines, the writing process can simultaneously write multiple pixels. The writing processes of this invention place multiple bit lines in a pixel, e.g., two bit lines are grouped in a pixel, the writing process is controlled to write two capacitors (one for right electrode and one for the left). This invention extends the concept further by providing multiple independent control units in a pixel. More bit lines, e.g., twenty bitlines, can be prepared by applying the non-sequential writing process to achieve simultaneously control these prepared lines.

Additional variations can be carried out to write more than a line at a time by dividing the array into two blocks and prepare two separate bit lines. For example upper half and lower half of array and the first bit line are connected to only the upper block and the second bit line is connected to the lower block. Prepare two bit line drivers at top and bottom. The control process can drive and store memory into the two blocks (upper half and lower half) independently, although it is necessary to prepare two sets of drivers and circuits.

The control process of active matrix drive is to prepare a column of address selector (select one row out of 1080) at a side, e.g., the left side usually, and a row of drivers at bottom which can send signal data to pixels in the selected row. When the address selector selects two rows with control signals to switch two rows ON, the data for one pixel will be stored in two pixels. The data input rate is therefore increased by overcoming the original limit as that set by the design of the active matrix control schemes.

Figure 3A:
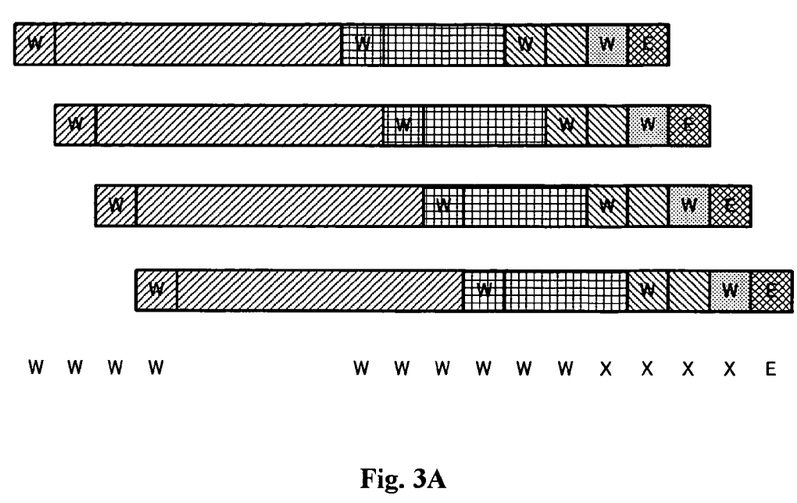
FIGS. 3A and 3B are examples of invalid blocks and groups combinations because there are occurrences of more than 1 block write in a unit time.
Figure 3B:
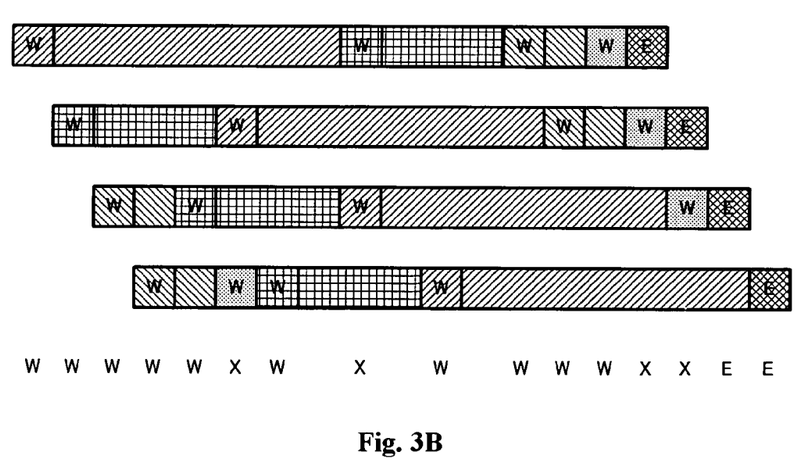
Figure 4A:
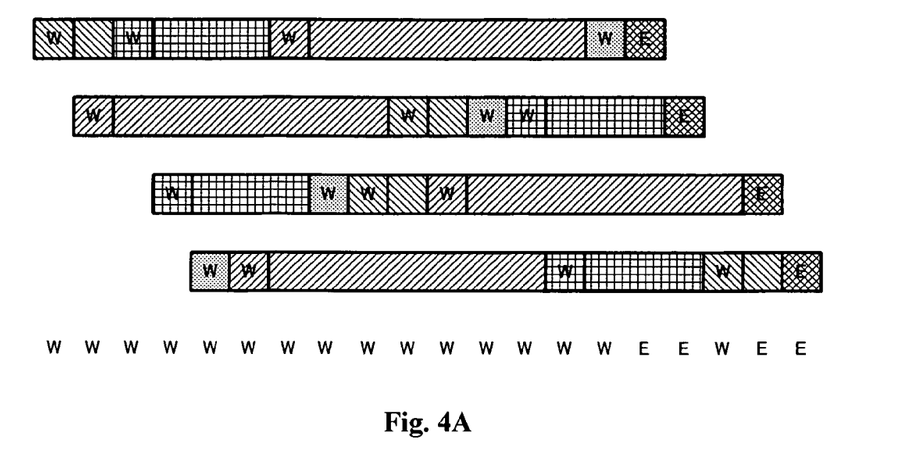
FIGS. 4A and 4B are 2 valid blocks and groups orders.
Figure 4B:
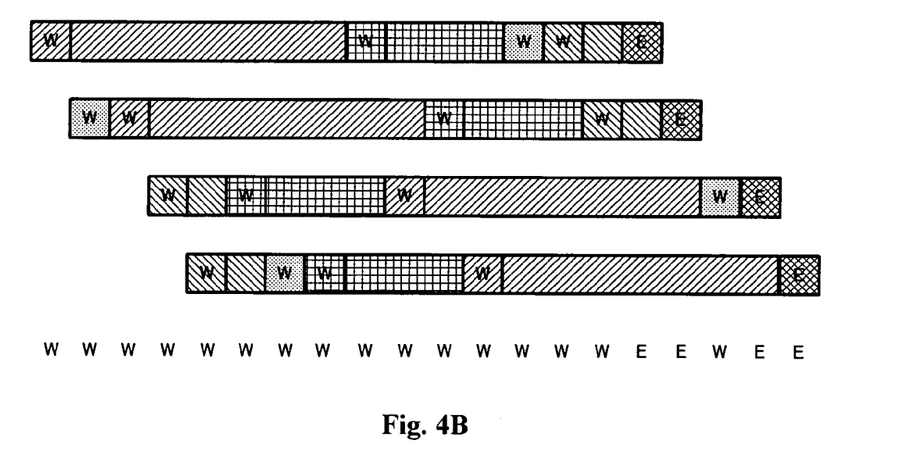

FIG. 3A and FIG. 3B are examples of invalid block writing combinations since there are occurrences where more than 1 writes occur. In the case of 4 groups each having 4-bit, there are 24 combinations in a group. The entire 4 groups then have 331776 combinations. However, there are only 2 specific blocks and groups order out of 331,776 combinations that do not have more than 1 write per unit time. These 2 combinations are shown on FIG. 4A and FIG. 4B.

An algorism is developed to select right combinations automatically by a computer, although it is not a mathematical formula. The algorithm can successfully calculate combinations up to N=8 and M=8. The only limitation is that there may be a great number of solutions exist and it is not possible to list all of these solutions. However, practically, only one solution is required to implement the improved writing process as disclosed in this invention.

A Non-Sequential Algorism which enables ⅛ speed data transfer is described below.

1 U=1 unit period=1 LSB period (21.7 micro-seconds for example)

The original algorism is to write an entire pixel array in 1U time period.

This new algorism is to write a group in 1U time period or to write data with 1/n speed, where n is the number of groups.
1. Divide an array into multiple groups (the samples are 4, 5 or 8 groups)
2. Write a group in 1U in non-sequential order as specified in the tables attached.
3. The non-sequential order must be selected to avoid the conflict wherein the number of rows to write simultaneously should not exceed the maximum number of rows the devise can write simultaneously.

Figure 5:
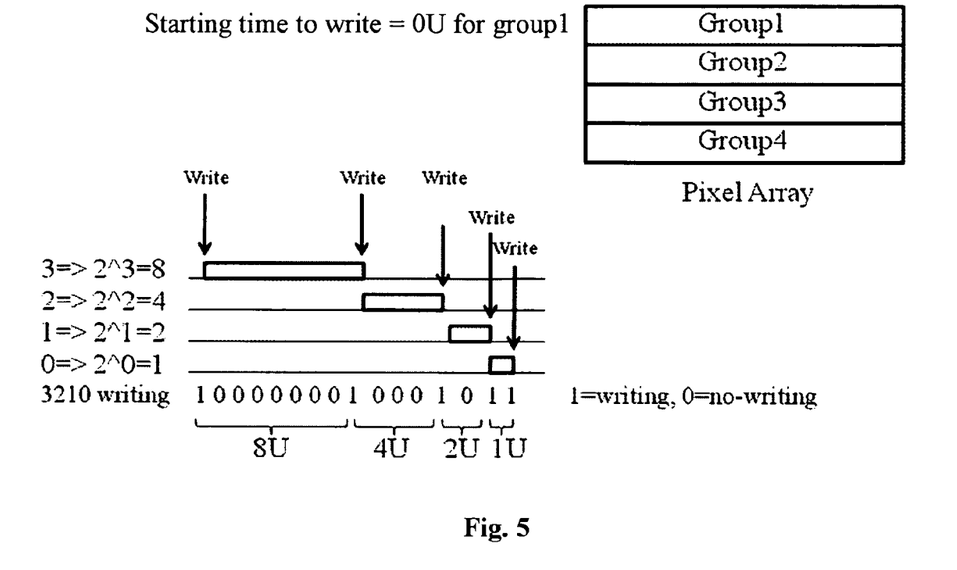
FIG. 5 illustrates the data bits divided into Group 1, 2, 3, 4, the starting time to write pixel data for group 1 is 0U, and the example shown is for the order of group 3210.

An example of sequential writing of 4 bits of grayscale data into 4 groups of regions in an array. The number of grayscale bits does not have to be equal to the number of groups. Any combinations are possible. An Example of sequential writing of 4 bits of grayscale data is to divide the pixels into 4 groups of regions in an array. The number of grayscale bits does not have to be equal to the number of groups. Any combinations are possible. As shown in FIG. 5, the for data bits divided into Group 1, 2, 3, 4, the starting time to write pixel data for group 1 is 0U, and the example shown in FIG. 5 is for the order of group 3210.

Figure 6:
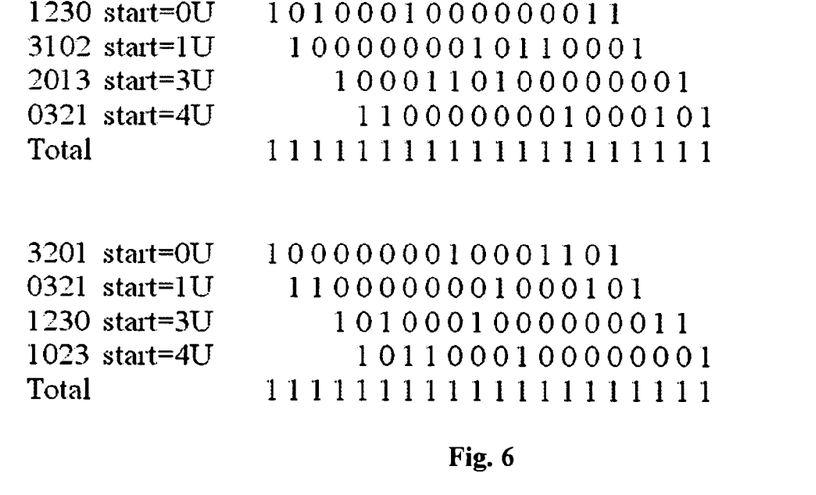
FIG. 6 shows the total number of permutation of 4 bit data is 4!=4×3×2×1=24 and total number of combination of 4 groups is 24^4=331,776 with a mathematical modeling programmed to test all the combination to compute two solutions with the starting times of 0, 1, 3, 4U
Figure 7:
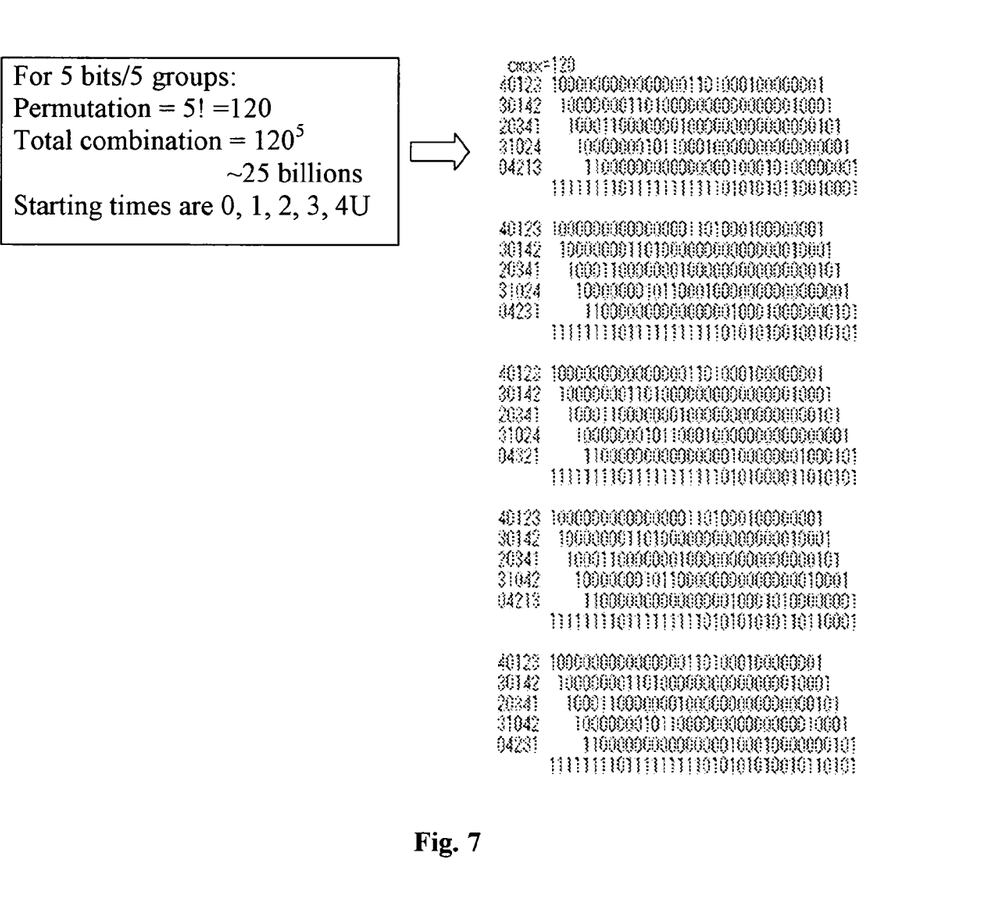
FIG. 7 shows the non-sequential writing process for data with five bits divided into five groups
Figure 8:
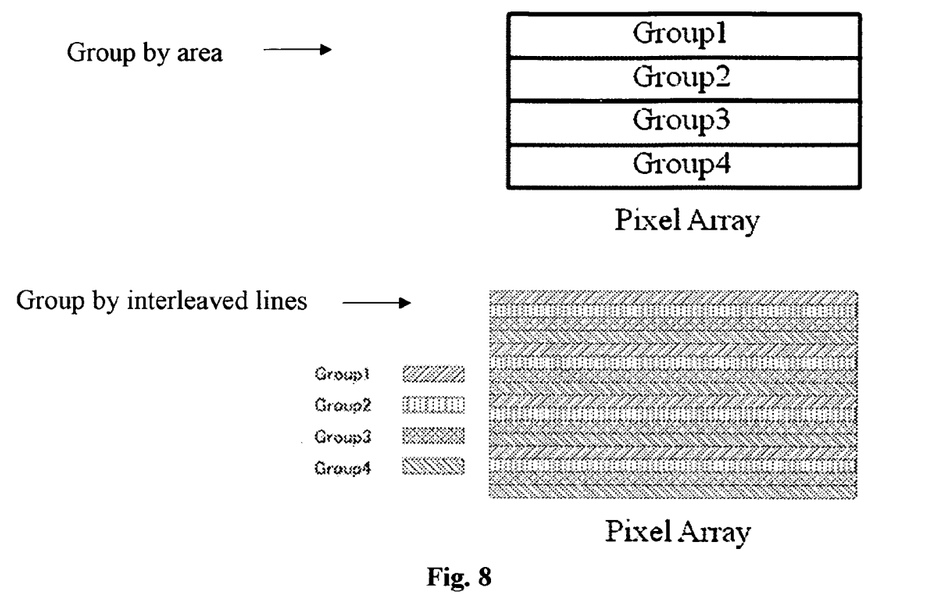
FIG. 8 shows the upper are and the lower areas are written with different non-sequential writing processes.

An example of sequential writing is shown below:
1=writing data, 0=no writing
Group 1 start=0U
Group 2 start=1U
Group 3 start=2U
Group 4 start=3U
Total Number: If the total number of writing is more than 1, simultaneous writing of multiple groups will be required. The structure of pixel array and its driver to write pixel data has the limitation of the number of rows which can be written simultaneously. This limit is often one or two depending on the number of independent bit lines per pixel. If it is one, the example of the above cannot be written where the total number is larger than 1. In order to overcome this limitation, non-sequential writing can avoid simultaneous writing. The total number of permutation of 4 bit data is 4!=4×3×2×1=24. The combination of 4 groups is 24^4=331,776. Mathematical modeling was programmed to test all the combination. Two solutions are computed as shown in FIG. 6 with the starting times of 0, 1, 3, 4U. But no solution existed with starting times of 0, 1, 2, 3U. FIG. 7 further shows an example of 5 bits/5 groups and FIG. 8 shows the writing processes for writing different areas of the pixels with grouping of regions. The upper figure shows one group by areas and one group by interleaved lines as shown in the lower figure.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An image display system implemented with a spatial light modulator (SLM) having a plurality of pixel elements to receive and apply image data of multiple bits to display image according to the image data, the image display system further comprising:
a controller to control a process of writing the image data into each of the pixel elements by dividing the image data of multiple bits into groups and writing each group of bits into the pixel element in a non-sequential order of significance of bit, neither in a order of from a most significant bit (MSB) to a least significant bit (LSB) nor from the LSB to the MSB, and without a writing conflict in writing said memory data into two pixel elements simultaneously during the process of writing.

2. The image display system of claim 1 wherein:
the pixel elements are configured as a pixel array having at least two rows of pixels.

3. The image display system of claim 2 wherein:
said controller controls the process of writing the image data to each of the pixels in each of said rows in a non-sequential order of significance.

4. The image display system of claim 1 wherein:
the pixel elements are configured as a pixel array having multiple rows of pixels; and
said controller controls the process of writing the image data to the pixels in different rows in a non-sequential order of significance.

5. The image display system of claim 2 wherein:
the pixel elements in each of the rows are divided into at least two groups; and
the controller controls the process of writing data into each of the rows and each of the two groups in a non-sequential order of significance; and
the controller controls the writing the group of pixels according a sequential order of a group number of each group.

6. The image display system of claim 2 wherein:
the pixel elements in each of the rows are divided into area groups according to a location of each of the pixels located at a different area in the pixel array and said controller controls the writing process of the image data in a non-sequential order in each of the groups according to the order of the area groups.

7. The image display system of claim 1 wherein:
the pixel elements in each of the rows are divided into groups consisted of interleaved lines.

8. The image display system of claim 1 wherein:
the pixel elements in each of the rows further comprises a micromirror whereby said SLM constituting a mirror device.

* * * * *